United States Patent [19]

Stubler et al.

[11] 4,424,642

[45] Jan. 10, 1984

[54] WATER STRIPPABLE ADHESIVE

[75] Inventors: Catherine E. Stubler, Morristown, N.J.; George N. Palmer, Wilmington, Del.; Paul J. Albee, Bensalem, Pa.

[73] Assignee: Allied Corporation, Morris Township, Morris County, N.J.

[21] Appl. No.: 285,203

[22] Filed: Jul. 20, 1981

[51] Int. Cl.³ .................... A01M 1/14; A01N 25/24
[52] U.S. Cl. ............................... 43/114; 43/136; 424/77
[58] Field of Search .............. 424/77; 43/114, 136

[56] References Cited

U.S. PATENT DOCUMENTS 2,179,339 11/1939 Little ........................................ 424/77

Primary Examiner—Allen J. Robinson
Attorney, Agent, or Firm—Richard A. Negin; Patrick L. Henry

[57] ABSTRACT

The present invention is a water strippable adhesive composition comprising ethylene vinyl acetate or oxidized ethylene vinyl acetate, and polyvinyl alcohol. A preferred composition additionally contains water and an emulsifier. The composition is useful in a method of using a water strippable adhesive, and in a method of trapping insects.

4 Claims, No Drawings

WATER STRIPPABLE ADHESIVE

BACKGROUND OF THE INVENTION

This invention relates to water strippable adhesives, more particularly this invention relates to a water strippable adhesive composition comprising ethylene vinyl acetate or oxidized ethylene vinyl acetate and polyvinyl alcohol and methods of use.

In various areas of agriculture, insect control, particularly fly control, is a continual and increasing problem. Particular agricultural areas where this is a problem, include mushroom growing, greenhouses, dairy barns, and home gardening. The use of insecticides is becoming more difficult. This is due in part to stringent Environmental Protection Agency regulations relating to toxicity.

The largest single mushroom production problem is fly control, mainly phorid and sciarid flies. White fly is a major insect problem in greenhouses and home gardens as well. The common house fly is a major dairy farm pest.

It is well known to use adhesives to trap small flying insects such as flies. These adhesives are commonly used on fly paper and fly strips. The fly lands on, and is trapped by the adhesive which remains sticky at ambient conditions. At periodic intervals the fly paper or strips are discarded and new fly paper or strips put in place.

Adhesives which are based on polyvinyl acetate are known which can contain small amounts of high viscosity polyvinyl alcohol. The high viscosity polyvinyl alcohol is used to improve adhesion and heat stability of the adhesive. Polyvinyl acetate adhesives dry upon application and leave a nonsticky or nontacky surface. It is also known to use polyvinyl alcohol in nonblocking, remoistenable adhesives. However, these adhesives are also of the type which must be moistened to have a tacky surface.

SUMMARY OF THE INVENTION

The present invention includes a composition comprising an oxidized ethylene vinyl acetate copolymer, or an ethylene vinyl acetate copolymer, and polyvinyl alcohol. The ethylene vinyl acetate copolymer has from 35 to 45 percent and preferably 38 to 42 percent by weight vinyl acetate moiety and a molecular weight of from 2,500 to 5,000, and preferably 3,000 to 3,500. The ethylene vinyl acetate can be oxidized to an acid number of from 1 to 30, preferably 10 to 20, and most preferably 16 to 18 milligrams of potassium hydroxide necessary to neutralize one gram of copolymer. The polyvinyl alcohol has a molecular weight of 2,000 to 25,000, and preferably from 5,000 to 15,000 and is about 70 percent to 95 percent hydrolyzed. The weight ratio of polyvinyl alcohol to oxidized ethylene vinyl acetate is from 3:1 to 1:2, and preferably 2.5:1 to 1:1. The composition preferably is an emulsion containing water and an emulsifier. A preferred composition contains water, a nonionic emulsifier and a weight ratio of polyvinyl alcohol to oxidized ethylene alcohol vinyl acetate of from about 1.25:1.

The present invention also includes a method of using a water strippable adhesive. The method is particularly useful in trapping insects. The method includes coating an adhesive composition onto a substructure. The adhesive composition is of the type described above. The adhesive composition can be washed off the substructure with water. When using the water strippable adhesive to trap insects, the insects contact and stick to the adhesive composition. The insects and the waterable strippable adhesive can then be washed away.

A particularly useful embodiment of the method is to use a composition of a water emulsion containing about 30 to 40 percent solids. It has been found that compositions containing this amount of solids can easily be sprayed on to the substructures.

The compositions of the present invention and methods of using them result in an adhesive composition which maintains its tackiness at ambient conditions. The adhesives composition is water soluble so that it can be washed away with water. The amount of water and the composition can be adjusted to the type of coating desirable. An advantage of the composition for use in the present invention is that it is non-toxic and can therefore be used in the agricultural areas discussed above.

DESCRIPTION OF THE INVENTION

The present invention is a composition comprising oxidized ethylene vinyl acetate copolymer or ethylene vinyl acetate copolymer, and polyvinyl alcohol. Preferably the present invention comprises oxidized ethylene vinyl acetate or ethylene vinyl acetate, polyvinyl alcohol, water and an emulsifier. The present invention also includes a method of using this composition as a water strippable adhesive, and a particular method of trapping insects using this water strippable adhesive composition.

The ethylene vinyl acetate copolymer useful in the composition of the present invention is used to provide the sticky or tacky property at ambient conditions. The ethylene vinyl acetate copolymer contains from 35 to 45 percent and preferably 38 to 42 percent by weight of a vinyl acetate moiety and has a molecular weight from 2,500 to 5,000, and preferably 3,000 to 3,500. The ethylene vinyl acetate copolymer can be made by a method similar to that disclosed in U.S. Pat. No. 3,658,741. The method disclosed in the '741 patent can be extended to greater weight percents vinyl acetates including the type useful in the composition of the present invention. The ethylene vinyl acetate copolymer can be oxidized to an acid number of from 1 to 30, preferably from 10 to 20, and most preferably 16 to 18 milligrams of potassium hydroxide necessary to neutralize one gram of copolymer. The ethylene vinyl acetate can be oxidized in a manner analogous to that disclosed in U.S. Pat. No. 2,952,649. Liquid ethylene vinyl acetate can be oxidized in a manner similar to the way solid polyethylene is oxidized in the melt. Oxidized ethylene vinyl acetate copolymer is preferred because it emulsifies more easily than ethylene vinyl acetate copolymer, particularly with polyvinyl alcohol in water.

Polyvinyl alcohol is a water soluble synthetic polymer made by alcoholysis, or hydrolysis, of polyvinyl acetate. It is a white to cream colored powder having a specific gravity of about 1.19 to 1.31. The properties of polyvinyl alcohol depend on the degree of polymerization and the percentage of alcoholysis, both of which are controllable in processing. The polyvinyl alcohol useful in the present invention has a molecular weight of from 2,000 to 15,000, preferably 3,000 to 15,000, and more preferably 3,000 to 10,000. The polyvinyl alcohol component of the composition allows the composition to be water strippable.

The preferred polyvinyl alcohol for use in the present invention is manufactured from polyvinyl acetate by methanolysis. The degree of hydrolysis is an indication of the extent of the methanolysis reaction, with 100 percent hydrolysis indicating complete reaction. The preferred polyvinyl alcohol is at least 70 to 95 percent hydrolyzed with the preferred range being from 80 to 90 percent, and most preferred from 87 to 89 percent.

Changes in molecular weight of the polyvinyl alcohol can be related to the viscosity of a 4 percent aqueous solution. The preferred polyvinyl alcohol has a viscosity of 2 to 15, preferably 2 to 10 and most preferably 4 to 6 centipoise. Water solubility increases as molecular weight decreases. Low viscosity, low molecular weight grade polyvinyl alcohol is preferred in the composition of the present invention.

The oxidized ethylene vinyl acetate or ethylene vinyl acetate copolymer and the polyvinyl alcohol can be emulsified in water with the use of the emulsifier. The amount of a particular emulsifier can be varied to obtain the desired emulsion. Generally, the emulsifier can be added in the range of about 3 to about 15, and preferably 5 to 12, parts by weight.

Although most available emulsifiers can be used, it is preferred to use a nonionic emulsifier. Nonionic emulsifiers have been found to make a uniform emulsion with no separation of the polymers. Anionic emulsifiers have been found to result in a separation of a polyvinyl alcohol in water layer, and an oxidized ethylene vinyl acetate layer.

An anionic emulsifier which has been used is oleic acid and morpholine. This can be used in any suitable concentrations with equal parts being preferred. Separation of the oxidized ethylene vinyl acetate copolymer layer and polyvinyl alcohol plus water layer can be overcome by mixing before application of the adhesive composition. In the most preferred embodiment a nonionic emulsifier can be used. A preferred class of nonionic emulsifiers are ethoxylated nonionic surfactants, particularly polyoxyethylated nonyl phenol. The nonionic emulsifier which has been used is IGEPAL TM CO-710 which is an ethoxylate nonionic surfactant, plus potassium hydroxide, and ethylene glycol. The IGEPAL TM CO-710, potassium hydroxide and ethylene glycol can be used in any suitable combination. A satisfactory combination in parts by weight has been 10 parts of Igepal CO-710, plus 0.6 parts potassium hydroxide, and 1.2 parts of ethylene glycol.

The following is a list of useful nonionic emulsifiers and their trademarks: ethoxylated octyl phenol (Triton X-100); ethoxylated nonyl phenol (Triton N-01); ethoxylated lauryl alcohol (Ethosperse LA-12, Glyco Chemicals Inc.); ethoxylated linear secondary alcohol (Tergetol 155-9, 155-12 Union Carbide Corp.); ethoxylated cetyl alcohol (Brij 58, ICI Corp.); ethoxylated stearyl alcohol (Brij 78, ICI Corp.); ethoxylated cetyl/stearyl alcohol (Lysal 15 CSA, Drew Chemical Corp.); and ethoxylated oleyl alcohol (Brij, ICI Corp.).

The following is a list of useful anionic emulsifiers which can be used with the present invention. These emulsifiers include: diethylaminoethanol, nitroethane, nitromethane, 2-amino-2-methyl-propanol, dimethylamino-2-methyl-1-propanol, 2-amino-2-ethyl-1, 3-propanoldiol, tris(hydroxymethyl)nitromethane, tris(-hydroxymethyl)aminomethane, 2-nitro-2-methyl-1-propanol, hydroxylammonium sulfate, morphylene, dimethylaminopropanol, ammonium hydroxide, triethylanolamine, diethyanolamine and diethyleneglycolmonoethylether.

For compositions containing water, there is preferably at least 50 percent by weight of water. The amount of water can range from causing the mixture to be 20 to 50 percent solids by weight with corresponding amounts of 80 to 50 percent by weight of water. The amount of water can be varied to suit the method of application. If the coating is to be applied by spraying, for example, there should be from 60 to 70 percent by weight water, leaving 30 to 40 percent by weight by solids. The composition can be further diluted as desired for a particular application.

The weight ratio of polyvinyl alcohol to ethylene vinyl acetate copolymer or oxidized ethylene vinyl acetate copolymer is from 3:1 to 1:2, preferably from 1.5:1 to 1:1 and more preferably 1.25:1. The amount of emulsifier can be added as needed with the recommended levels indicated above. A preferred composition comprises 30 to 40 parts by weight of ethylene acetate or oxidized ethylene vinyl acetate copolymer and from 25 to 45 parts by weight of polyvinyl alcohol. There can be from about 8 to about 15 parts by weight of emulsifier composition and sufficient water so that the composition contains from 25 to 45 percent solids, or 55 to 75 percent by weight water.

The composition of the present invention can be used in a method to apply and remove a water strippable adhesive, and is particularly useful in using a water strippable adhesive for trapping insects, particularly flies of the type discussed in the background of the invention.

The composition of the present invention can be prepared by making an emulsion. The ethylene vinyl acetate copolymer or oxidized ethylene vinyl acetate copolymer is mixed with an emulsifying agent and water. Polyvinyl alcohol can be added to this mixture. Alternatively, the polyvinyl alcohol can be separately mixed and dissolved in the water and then added to a mixture of an emulsifying agent plus the ethylene vinyl acetate or oxidized ethylene vinyl acetate copolymer. The composition of the present invention can be coated by various methods. A preferred composition for spraying contains about 60 to 70 percent water. However, the percent water can be varied as desired depending on the equipment used and the concentration of adhesive desired in the spray. Higher viscosity, lower percentage water compositions can be used with other means to coat such as by direct application with a brush or a roller.

A composition of the present invention can be prepared by dissolving the polyvinyl alcohol in a solvent. The polyvinyl alcohol in the solvent can be mixed directly with ethylene vinyl acetate or oxidized ethylene vinyl acetate.

Several examples are set forth below to illustrate the nature of the invention and the manner of carrying it out. However, the invention should not be considered as being limited to the details thereof.

EXAMPLES 1–2

Following is an illustration of a method of preparing oxidized ethylene vinyl acetate from ethylene vinyl acetate. The ethylene vinyl acetate used was Allied Corporation, A-C® 440. This ethylene vinyl acetate copolymer is a viscous liquid having a density of 0.94 grams per cubic centimeter (ASTM D-1505), a Brookfield viscosity at 140° C. of 350 centipoises, and a 40 percent by weight vinyl acetate moiety. The ethylene vinyl acetate copolymer has sufficient tack at ambient conditions. It is preferred to oxidize the ethylene vinyl acetate because it forms an emulsion more easily.

The A-C® 440 was placed in a 4000 ml reaction vessel and heated to 145° C. with constant agitation. The temperature was monitored and maintained. Oxygen gas was distributed throughout the vessel at the rate of 24 cubic feet per minute. In Example 1, 1500 ml of material was made, and in Example 2 3000 ml of material was made. The extent of reaction was measured by measuring the acid number of the reacting mixture. The acid number in milligrams of potassium hydroxide necessary to neutralize one gram of copolymer sample is an indication of the extent of oxidation. The results are summarized in Table I below.

TABLE I

| Time (Hours) | 2.0 | 3.0 | 4.0 | 5.0 | 5.5 | 7.0 | 8.5 |
|---|---|---|---|---|---|---|---|
| Ex. 1 (Acid No.) | 4.8 | — | 8.9 | — | 17.6 | — | — |
| Ex. 2 (Acid No.) | — | 5.5 | — | 8.9 | — | 13.5 | 16.7 |

EXAMPLES 3-4

In Examples 3 and 4, 30 percent and 40 percent solids emulsions of oxidized ethylene vinyl acetate (OEVA) of Example 1 were made. Referring to Table II the OEVA was mixed with an anionic emulsifier consisting of oleic acid and morpholine. Sufficient water was added in Example 3 to give a 30 percent solids emulsion and sufficient water was added in Example 4 to give a 40 percent solid emulsion. Polyvinyl alcohol was added to the emulsions in Examples 3 and 4 of Table II in sufficient quantity to give a resulting mixture having a Brookfield viscosity at 140° C. of 10,000 centipoises. In Example 3, Monsanto Gelvatol TM polyvinyl alcohol resin grade 20-30 was used, and in Example 4 Gelvatol TM polyvinyl alcohol resin grade 40-20 was used. Monsanto Gelvatol® polyvinyl alcohol resin grade 20-30 has a viscosity of 4 to 6 centipoises, a residual polyvinyl acetate content of 20 to 25 percent, is 88.7 to 85.5 percent hydrolyzed, has an approximate weight average molecular weight of about 10,000, and a maximum ash content of 0.75. Monsanto Gelvatol TM resin grade 40-20 has a viscosity of 2.4 to 3 centipoises, a residual polyvinyl acetate content of 37 to 42 percent, is 77 to 72.9 percent hydrolyzed, has an approximate weight average molecular weight of 3000 and a percent ash content or no more than 1 percent. Monsanto describes Gelvatol TM polyvinyl alcohol resins as generally being white to light straw granular powders having a specific gravity of 1.19 to 1.27. Water is described as the only universal and practical solvent for Gelvatol TM. Gelvatol TM resins are described as having excellent emulsifying properties. The polyvinyl alcohol was added to the emulsions prepared as indicated in Table III. Values in Table II and III are parts by weight.

TABLE II

| | Example 3 | Example 4 |
|---|---|---|
| OEVA | 40 | 40 |
| Oleic Acid | 7 | 7 |
| Morpholine | 7 | 7 |
| Water | 81 | 126 |
| TOTAL | 135 | 160 |
| Wt % SOLIDS | 30 | 40 |

TABLE III

| | Example 3 | Example 4 |
|---|---|---|
| Emulsion | 135 | 160 |
| PVA 20/30 | 35 | — |
| PVA 40/20 | — | 46 |

It was found that it was necessary to use a high shear stirrer to maintain a single phase emulsion of the polyvinyl alcohol and the oxidized ethylene vinyl acetate in water. The oxidized ethylene vinyl acetate separated into a separate layer from the polyvinyl alcohol and water when the emulsion was left to stand. Therefore, before using this emulsion it is necessary to sufficiently agitate it to attain the single phase emulsion. The single phase emulsion when coated on a substrate results in a sticky or tacky layer to which insects such as white flies will stick and not be able to release themselves. This sticky layer can be washed away with water.

EXAMPLE 5

An emulsion was prepared from 40 parts by weight of the oxidized ethylene vinyl acetate copolymer as described in Example 1, 7 parts by weight oleic acid, 7 parts by weight of morpholine, 81 parts by weight of water, 17 parts of Gelvatol TM polyvinyl alcohol grade 40-20 as described with reference to Example 4, and 17 parts of Methocel TM. Methocel is a methyl-cellulose thickening agent manufactured by Dow Chemical Co. The emulsion was prepared by heating the water, and adding polyvinyl alcohol, oleic acid and morpholine to the heated water. The oxidized ethylene vinyl alcohol was added to the heated mixture. The mixture was continually stirred with a high shear stirrer. The mixture was allowed to cool down slightly and the Methocel was added. It was found that a thickening agent can be added, but that it was not necessary to obtain an adhesive which dries to a consistency which enables it to be applied to vertical surfaces.

EXAMPLE 6

An emulsion of oxidized ethylene vinyl acetate of the type described in Example 1 was made using the anionic emulsifier of oleic acid and morpholine. Forty parts by weight of oxidized ethylene vinyl acetate was added to 81 parts by water containing 7 parts of oleic acid and 7 parts of morpholine. This mixture was continually stirred with a high speed stirrer. To this was added 17 parts by weight of Gelvatol TM 40-20 polyvinyl alcohol resin. A sample weighing approximately 2,750 grams was prepared. This sample was evaluated using a pressure type atomizer. It was found that the anionic emulsion of this sample separated unless continually mixed. Additionally, it was found that the sample could not be spray coated unless it was further diluted.

EXAMPLE 7

An emulsion comprising 30 parts by weight of the oxidized ethylene vinyl acetate described in Example 1 was used. Polyvinyl alcohol Vinol TM 205S manufactured by Air Products and Chemicals, Inc. was used. The Vinol TM 205S is a fine particle size polyvinyl alcohol which will pass through a U.S.S. 80-mesh screen. The Vinol TM 205 has a viscosity of 4 to 6 centipoise and is hydrolyzed to 87 to 89 percent. The viscosity is measured in centipoise in a 4 percent aqueous solution at 20° C. The composition was prepared by dissolving the polyvinyl alcohol, Vinol TM 205S in water and heating to 95° C. The oxidized ethylene vinyl acetate and oleic acid were heated to 125° C. at which time morpholine was added. The mixture of oxidized ethylene vinyl acetate, oleic acid and morpholine was poured with agitation into the polyvinyl alcohol solution. The mixture was cooled with agitation to room temperature. Here again separation of a polyvinyl alcohol and water layer and oxidized ethylene vinyl acetate layer was observed when agitation was stopped.

EXAMPLE 8

This example illustrates an emulsion composition of the present invention using a nonionic emulsifier. Forty parts by weight of oxidized ethylene vinyl acetate as described in Example 1 was emulsified with 10 parts of IGEPAL ® CO-710 which is an ethoxylate nonionic surfactant. IGEPAL ® CO-710 is manufactured by Antara Chemicals, a Division of GAF Corporation. Igepal CO-710 is a nonylphenoxypoly(ethyleneoxy)ethanol having a density at 25° C. of 1.07, and a viscosity at 25° C. of 175 to 200 centipoises. Igepal CO-710 is described in more detail in Igepal Bulletin No. AP-45-6. Additionally, 0.6 parts by weight of potassium hydroxide and 1.2 parts by weight of ethylene glycol were added. This mixture was heated in a manner similar to that in Example 7. This mixture was added to a mixture of 115.2 parts of water and 25 parts of Vinol TM 205 polyvinyl alcohol. This resulted in a 40 percent solids emulsion. This emulsion was found not to separate into two layers. Even without agitation, one uniform emulsion formed. At 40 percent solids this emulsion could be applied by spraying methods. Upon spraying it, it dries leaving a sticky surface. This surface coating of emulsion can be washed away using a spray of water.

EXAMPLE 9

Example 8 was repeated using 30 percent by weight of oxidized ethylene vinyl acetate, as described in Example 1, 7.5 percent by weight of IGEPAL ® CO-710, 0.45 parts by weight of potassium hydroxide, 0.9 parts by weight of ethylene glycol, 115 parts by weight of water and 35 parts by weight of Vinol TM 205 polyvinyl alcohol.

Increasing the polyvinyl alcohol content increases the water strippability of the coated emulsion. The more polyvinyl alcohol that is added, the more easily the adhesive coating is stripped away with water. It was found that by using 30 parts by weight of oxidized ethylene vinyl acetate and 35 parts by weight of Vinol TM 205 polyvinyl alcohol a coated adhesive was obtained onto which flies adhere to easily upon landing and which can easily be washed away.

While exemplary embodiments of the invention have been described, the true scope of the invention is to be determined by the following claims.

What is claimed is:

1. A method of trapping insects comprising the steps of:
   coating an effective trapping amount of an adhesive composition onto a substructure the adhesive composition comprising:
   a tacky component selected from the group consisting of: ethylene vinyl acetate copolymer and oxidized ethylene vinyl acetate copolymer, the ethylene vinyl acetate copolymer containing from 35 to 45 percent by weight of a vinyl acetate moiety and having a molecular weight from 2,500 to 5,000;
   polyvinyl alcohol having a molecular weight from 2,000 to 25,000, the weight ratio of polyvinyl alcohol to tacky component being from 3:1 to 1:2; an emulsifier; and water;
   trapping the insects which land on an adhesive to the coating composition; and
   washing the adhesive composition and insects off of the substructure with water.

2. The method as recited in claim 1 further comprising the step of drying the composition on the on the substructure after coating.

3. The method as recited in claim 1 wherein the tacky component is oxidized ethylene vinyl acetate copolymer, oxidized to an acid number of from 1 to 30 milligrams of potassium hydroxide necessary to neutralize one gram of oxidized ethylene vinyl acetate copolymer.

4. The method as recited in claim 1 wherein the adhesive composition is sprayed onto the substructure.

* * * * *

UNITED STATES PATENT AND TRADEMARK OFFICE
CERTIFICATE OF CORRECTION

PATENT NO. : 4,424,642
DATED : January 10, 1984
INVENTOR(S) : Catherine E. Stubler, et al.

It is certified that error appears in the above-identified patent and that said Letters Patent are hereby corrected as shown below:

Column 2, line 13: "adhesives" should read --adhesive--.

Column 5, line 39: "Gelvatol ®" should read --Gelvatol TM--.

Signed and Sealed this

Fourth Day of June 1985

[SEAL]

Attest:

DONALD J. QUIGG

Attesting Officer   Acting Commissioner of Patents and Trademarks